(12) United States Patent
Kano

(10) Patent No.: US 9,996,337 B2
(45) Date of Patent: Jun. 12, 2018

(54) ELECTRONIC APPARATUS, POWER SUPPLY DEVICE, SYSTEM AND APPARATUS

(71) Applicant: NIKON CORPORATION, Chiyoda-ku, Tokyo (JP)

(72) Inventor: Goro Kano, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days. days.

(21) Appl. No.: 15/634,455

(22) Filed: Jun. 27, 2017

(65) Prior Publication Data
US 2017/0344358 A1 Nov. 30, 2017

Related U.S. Application Data

(63) Continuation of application No. 14/239,840, filed as application No. PCT/JP2012/005191 on Aug. 17, 2012, now abandoned.

(30) Foreign Application Priority Data

Aug. 23, 2011 (JP) .................................. 2011-181965

(51) Int. Cl.
*G06F 9/44* (2018.01)
*G06F 9/445* (2018.01)
(Continued)

(52) U.S. Cl.
CPC ................. *G06F 8/65* (2013.01); *G06F 1/26* (2013.01); *H01M 10/46* (2013.01); *H02J 7/025* (2013.01);
(Continued)

(58) Field of Classification Search
CPC ........................................................ G06F 9/44
(Continued)

(56) References Cited

U.S. PATENT DOCUMENTS 6,876,644 B1 4/2005 Hsu et al.
6,950,820 B2 9/2005 Bae
(Continued)

FOREIGN PATENT DOCUMENTS

JP H11-75325 A 3/1999
JP 2008-71063 A 3/2008
(Continued)

OTHER PUBLICATIONS

May 12, 2015 Office Action issued in Japanese Patent Application No. 2011-181965.
(Continued)

*Primary Examiner* — Jae Jeon
(74) *Attorney, Agent, or Firm* — Oliff PLC

(57) ABSTRACT

A power supply device is caused to execute a new program. An electronic apparatus that receives power from a power supply device in a non-contact manner includes: an intra-apparatus circuit that operates with power received via a power transmission path from the power supply device to the electronic apparatus; a program acquiring unit that acquires a program to be executed by the power supply device from outside, and stores the program; and an apparatus-side communicating unit that transmits the program to the power supply device via the power transmission path.

23 Claims, 9 Drawing Sheets

(51) Int. Cl.
| | | |
|---|---|---|
| *H01M 10/46* | (2006.01) | |
| *G06F 1/26* | (2006.01) | |
| *H02J 7/02* | (2016.01) | |
| *H01M 10/42* | (2006.01) | |

(52) U.S. Cl.
CPC .... *H01M 2010/4278* (2013.01); *Y02B 60/183* (2013.01)

(58) Field of Classification Search
USPC .................................................. 717/168–171
See application file for complete search history.

(56) References Cited

U.S. PATENT DOCUMENTS

| | | | |
|---|---|---|---|
| 8,299,752 | B2 | 10/2012 | Sekita et al. |
| 8,384,525 | B2 | 2/2013 | Ronkka et al. |
| 2002/0192516 | A1 | 12/2002 | Tajima |
| 2005/0235174 | A1 | 10/2005 | Curt et al. |
| 2006/0038661 | A1 | 2/2006 | Reinhold et al. |
| 2007/0032274 | A1 | 2/2007 | Lee et al. |
| 2007/0132665 | A1 | 6/2007 | Kent |
| 2008/0086652 | A1 | 4/2008 | Krieger et al. |
| 2009/0271047 | A1 | 10/2009 | Wakamatsu |
| 2010/0050006 | A1 | 2/2010 | Nishibayashi et al. |
| 2010/0194335 | A1* | 8/2010 | Kirby ............... H02J 5/005 320/108 |
| 2011/0112610 | A1 | 5/2011 | Rahman et al. |
| 2012/0011497 | A1 | 1/2012 | Moon et al. |
| 2012/0161539 | A1* | 6/2012 | Kim ............... H02J 17/00 307/104 |
| 2012/0311555 | A1* | 12/2012 | Nijenkamp ............... G06F 8/65 717/170 |
| 2012/0325980 | A1 | 12/2012 | Noffsinger et al. |

FOREIGN PATENT DOCUMENTS

| | | |
|---|---|---|
| JP | 2009-213295 A | 9/2009 |
| JP | 2009-537887 A | 10/2009 |
| JP | 2010-114735 A | 5/2010 |
| JP | 2010-152641 A | 7/2010 |
| JP | 2010-246292 A | 10/2010 |
| JP | 2010-284075 A | 12/2010 |
| JP | 2011-030404 A | 2/2011 |
| WO | 10/057224 A1 | 5/2010 |

OTHER PUBLICATIONS

Apr. 16, 2015 Extended European Search Report issued in European Application No. 12826066.8.
Dec. 25, 2015 Office Action issued in Chinese Application No. 2012800403961.
Mar. 11, 2016 US Office action issued in U.S. Appl. No. 14/239,840.
Aug. 17, 2016 Office Action issued in European Patent Application No. 12826066.8.
Jan. 27, 2017 Office Action Issued in U.S. Appl. No. 14/239,840.
Nov. 4, 2016 Office Action issued in Chinese Application No. 201280040396.1.
Translation of Feb. 25, 2014 International Preliminary Report on Patentability issued in International Patent Application No. PCT/JP2012/005191.
Sep. 18, 2012 Search Report issued in International Patent Application No. PCT/JP2012/005191.
Jun. 28, 2017 Office Action issued in Chinese Patent Application No. 2012/0040396.1.

\* cited by examiner

FIG. 2

ELECTRONIC APPARATUS, POWER SUPPLY DEVICE, SYSTEM AND APPARATUS

This is a Continuation of U.S. application Ser. No. 14/239,840 filed Feb. 20, 2014, which is a National Phase of International Application No. PCT/JP2012/005191 filed Aug. 17, 2012, which claims the benefit of priority of JP2011-181965 filed Aug. 23, 2011. The disclosure of the prior applications are hereby incorporated by reference herein in their entirety.

TECHNICAL FIELD

The present invention relates to an electronic apparatus, a power supply device, a system, and an apparatus.

RELATED ART

An electrically non-contact power charging system for an electronic apparatus has been known. When an electronic apparatus is located at a position where power supply is possible, the system starts power supply after authentication of the electronic apparatus.
Patent Document No. 1: Japanese Patent Application Publication No. 2009-213295

SUMMARY

In such a system, a power supply device has a processor for a processing with an electronic apparatus, such as communication and authentication. The processor executes a program preloaded at the time of factory shipment and the like to perform a processing such as communication and authorization.

Programs are updated to newer versions day by day. However, the power supply device in such a system does not have functions for communication or connectivity with an external memory. Accordingly, the power supply device has not been able to update a preloaded program.

Therefore, it is an object of an aspect of the innovations herein to provide an electronic apparatus, a power supply device, system and apparatus, which are capable of overcoming the above drawbacks accompanying the related art. The above and other objects can be achieved by combinations described in the claims. A first aspect of the present invention provides an electronic apparatus that receives power from a power supply device in a non-contact manner, the electronic apparatus including: an intra-apparatus circuit that operates with power received via a power transmission path from the power supply device to the electronic apparatus; a program acquiring unit that acquires a program to be executed by the power supply device from outside, and stores the program; and an apparatus-side communicating unit that transmits the program to the power supply device via the power transmission path.

A second aspect of the present invention provides an electronic apparatus that receives power from a power supply device in a non-contact manner, the electronic apparatus including: an intra-apparatus circuit that operates with power received from the power supply device via a power transmission path from the power supply device to the electronic apparatus; a supply-side communicating unit that receives, from the power supply device via the power transmission path, a program to be executed by the electronic apparatus; and a processor that executes the program received by the supply-side communicating unit to control the intra-apparatus circuit.

A third aspect of the present invention provides a power supply device that supplies power to an electronic apparatus in a non-contact manner, the power supply device including: a supply-side communicating unit that receives, from the electronic apparatus via a power transmission path from the power supply device to the electronic apparatus, a program to be executed by the power supply device; and a control processor that executes the program received by the supply-side communicating unit to control power supply to the electronic apparatus.

A fourth aspect of the present invention provides a power supply device that supplies power to an electronic apparatus in a non-contact manner, the power supply device including: a program acquiring unit that acquires a program to be executed by the electronic apparatus from outside, and stores the program; and an apparatus-side communicating unit that transmits, to the electronic apparatus via a power transmission path from the power supply device to the electronic apparatus, the program that the program acquiring unit stores.

A fifth aspect of the present invention provides a system including an electronic apparatus and a power supply device that supplies power to the electronic apparatus in a non-contact manner, wherein the electronic apparatus includes: an intra-apparatus circuit that operates with power received via a power transmission path from the power supply device to the electronic apparatus; a program acquiring unit that acquires a program to be executed by the power supply device from outside, and stores the program; and an apparatus-side communicating unit that transmits the program to the power supply device via the power transmission path, and the power supply device includes: a supply-side communicating unit that receives the program from the electronic apparatus via the power transmission path; and a control processor that executes the program received by the supply-side communicating unit to control power supply to the electronic apparatus.

A sixth aspect of the present invention provides a system including an electronic apparatus and a power supply device that supplies power to the electronic apparatus in a non-contact manner, wherein the power supply device includes: a program acquiring unit that acquires a program to be executed by the electronic apparatus from outside, and stores the program; and an apparatus-side communicating unit that transmits, to the electronic apparatus via a power transmission path from the power supply device to the electronic apparatus, the program that the program acquiring unit stores, and the electronic apparatus includes: an intra-apparatus circuit that operates with power received from the power supply device via the power transmission path; a supply-side communicating unit that receives the program from the power supply device via the power transmission path; and a processor that executes the program received by the supply-side communicating unit to control the intra-apparatus circuit.

A seventh aspect of the present invention provides an apparatus that exchanges power with another apparatus in a non-contact manner, the apparatus including a communicating unit that performs at least either one of transmission and reception of a program between the apparatus and the other apparatus via a power transmission path for exchanging power with the other apparatus in a non-contact manner.

The summary clause does not necessarily describe all necessary features of the embodiments of the present invention. The present invention may also be a sub-combination of the features described above.

BRIEF DESCRIPTION OF THE DRAWINGS

FIG. 2 shows the functions and configuration of the power charging system 10 according to the present embodiment.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
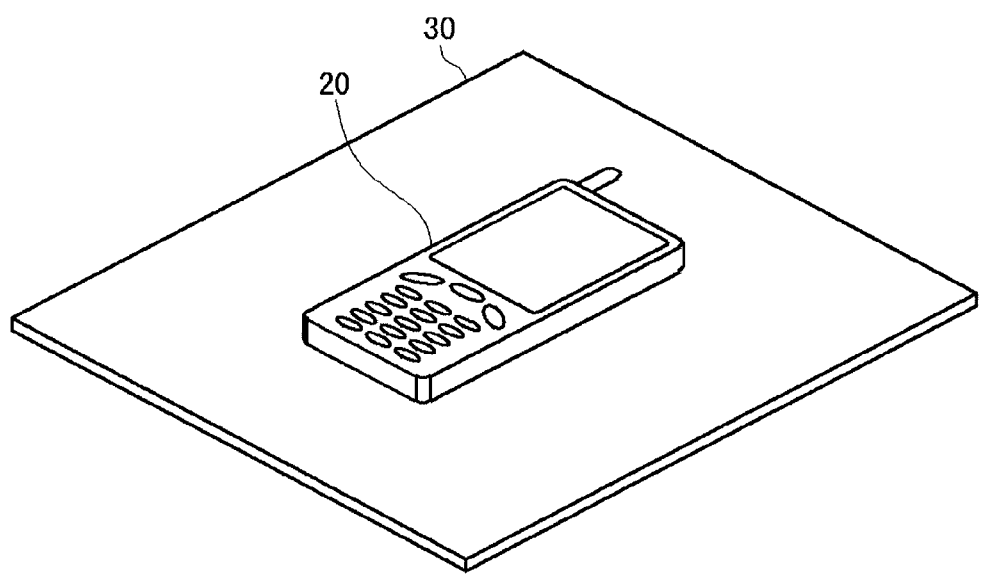
FIG. 1 shows the appearance of a power charging system 10 according to an embodiment.

FIG. 1 shows the appearance of a power charging system 10 according to an embodiment. The power charging system 10 according to the present embodiment includes an electronic apparatus 20 and a power supply device 30. The electronic apparatus 20 operates with power stored in a secondary battery inside thereof.

The power supply device 30 supplies power to the electronic apparatus 20 in a non-contact manner. Here, when power is supplied "in a non-contact manner", metallic terminals are not connected directly for conduction, and components may be in mechanical contact via insulating materials and the like of the housings of the apparatus and the like. In the present embodiment, the power supply device 30 supplies power to the electronic apparatus 20 by electromagnetic induction using a coil. Alternatively, the power supply device 30 may supply power, for example, by electric field and magnetic resonance. Techniques of supplying power to the electronic apparatus 20 in a non-contact manner are called wireless power supply, non-contact power transfer, non-contact power transmission and the like.

For example, the power supply device 30 is tabular, and supplies power to the electronic apparatus 20 in a state that the electronic apparatus 20 is placed on the surface thereof With the power charging system 10, the electronic apparatus 20 can be charged merely by being placed on the power supply device 30 without requiring special attachment and detachment operations with respect to a charging apparatus.

Figure 2:
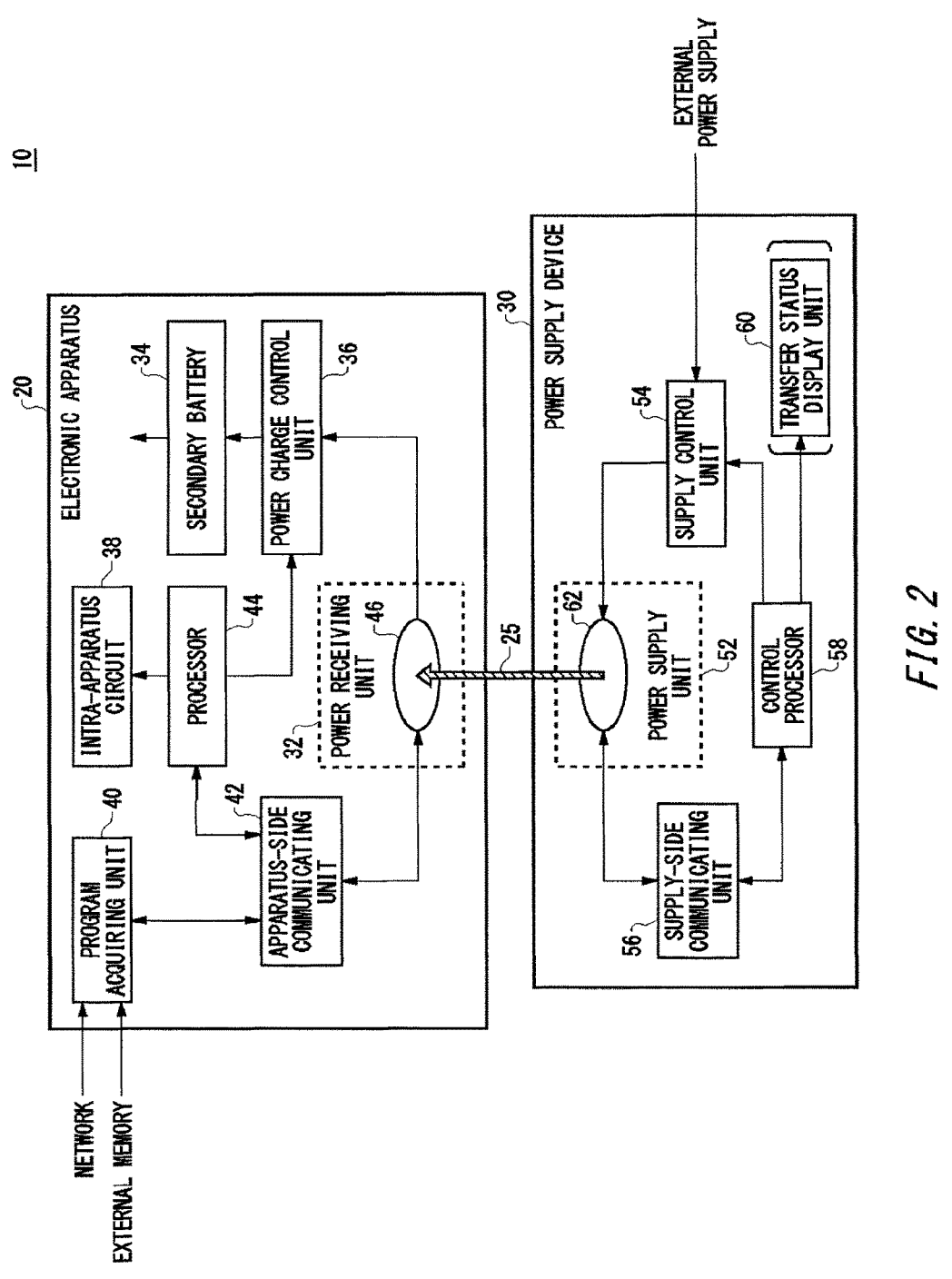

FIG. 2 shows the functions and configuration of the power charging system 10 according to the present embodiment. When the electronic apparatus 20 is placed on the power supply device 30, a power transmission path 25 is formed to transmit power from the power supply device 30 to the electronic apparatus 20 in an electrically non-contact manner. Thereby, the power supply device 30 can charge the electronic apparatus 20. In the present embodiment, the power transmission path 25 is a pathway that transmits power by electromagnetic induction.

The electronic apparatus 20 has a power receiving unit 32, a secondary battery 34, a power charge control unit 36, an intra-apparatus circuit 38, a program acquiring unit 40, an apparatus-side communicating unit 42, and a processor 44. The power receiving unit 32 receives power from the power supply device 30 in a non-contact manner. In the present embodiment, the power receiving unit 32 has a coil 46, and works together with a power supply unit 52 of the power supply device 30 to form the power transmission path 25.

The secondary battery 34 stores power received via the power transmission path 25. The power stored in the secondary battery 34 is supplied to each circuit in the electronic apparatus 20.

The power charge control unit 36 causes the power that the power receiving unit 32 has received from the power supply device 30 to be supplied to and stored in the secondary battery 34. For example, the power charge control unit 36 rectifies and converts an AC voltage received from the power receiving unit 32 into a DC voltage, and causes the power to be stored in the secondary battery 34.

The intra-apparatus circuit 38 operates with power received from the power supply device 30 via the power transmission path 25. In the present embodiment, the intra-apparatus circuit 38 operates with power stored in the secondary battery 34.

The program acquiring unit 40 acquires a designated program from the outside of the electronic apparatus 20 and stores the program therein. For example, the program acquiring unit 40 downloads a designated program from an external server via a network and stores the program therein. Also, for example, the program acquiring unit 40 reads out a designated program from an external memory such as a memory card that is mounted to the electronic apparatus 20, and stores the program therein.

The program acquiring unit 40 acquires, as such a designated program, an updating program for updating a program that is currently executed by a control processor 58 of the power supply device 30. For example, the program acquiring unit 40 acquires an updating program for updating a power charge control program of the power supply device 30. Also, when the power supply device 30 performs functions other than power supply, an updating program for updating a program to control the functions may be acquired. For example, the program acquiring unit 40 acquires an updating program for updating a scheme to authenticate an ID between the power supply device 30 and the electronic apparatus 20. Also, for example, the program acquiring unit 40 acquires an updating program for causing a program that is currently executed by the power supply device 30 to support a new type of the electronic apparatus 20.

Also, a program that the program acquiring unit 40 acquires is not limited to a program aimed for an update, but the program acquiring unit 40 may acquire a new program that can add a new function to the power supply device 30. For example, the program acquiring unit 40 acquires a program for causing the power supply device 30 to function as an image display apparatus, a program for causing the power supply device 30 to function as a music player apparatus, a program for causing the power supply device 30 to function as a clock, and other programs.

The apparatus-side communicating unit 42 communicates data with the power supply device 30 via the power transmission path 25. In the present embodiment, the apparatus-side communicating unit 42 communicates data with a supply-side communicating unit 56 in the power supply device 30 by modulating and demodulating current flowing through the coil 46 of the power receiving unit 32 according to a predetermined scheme. In the present embodiment, the apparatus-side communicating unit 42 transmits a program acquired by the program acquiring unit 40 to the power supply device 30 via the power transmission path 25.

The processor 44 controls each circuit, including the intra-apparatus circuit 38, in the electronic apparatus 20. Furthermore, the processor 44 executes an authentication process and the like with the power supply device 30 using data that the apparatus-side communicating unit 42 has communicated with the power supply device 30.

The power supply device 30 has the power supply unit 52, a supply control unit 54, the supply-side communicating unit 56, and the control processor 58. The power supply unit 52 supplies power to the electronic apparatus 20 in a non-contact manner. In the present embodiment, the power supply unit 52 has a coil 62, and works together with the power receiving unit 32 of the electronic apparatus 20 to form the power transmission path 25.

The supply control unit 54 receives power from an external power supply, and controls the power supply unit 52 to transfer the power received from the external power supply to the electronic apparatus 20 via the power transmission path 25. For example, the supply control unit 54 varies current flowing through the coil 62 of the power supply unit 52 to induce current in the coil 46 of the power receiving unit 32 by electromagnetic induction.

The supply-side communicating unit 56 communicates data with the electronic apparatus 20 via the power transmission path 25. In the present embodiment, the supply-side communicating unit 56 communicates data with the apparatus-side communicating unit 42 in the electronic apparatus 20 by modulating and demodulating current flowing through the coil 62 of the power supply unit 52 according to a predetermined scheme. In the present embodiment, the supply-side communicating unit 56 receives a program from the electronic apparatus 20 via the power transmission path 25.

The control processor 58 controls each circuit in the power supply device 30. Also, the control processor 58 executes an authentication process and the like with the electronic apparatus 20 using data that the supply-side communicating unit 56 has communicated with the electronic apparatus 20. Also, the control processor 58 controls the power supply amount of the supply control unit 54.

Furthermore, when the supply-side communicating unit 56 receives a program, the control processor 58 executes the received program. In the present embodiment, the control processor 58 controls power supply to the electronic apparatus 20 by executing a program received by the supply-side communicating unit 56.

Either or both of the electronic apparatus 20 and the power supply device 30 may further have a transfer status display unit 60. The transfer status display unit 60 displays the transfer status, the transfer rate, the amount of data that has been transferred, and the like about a program transferred from the electronic apparatus 20 to the power supply device 30. Thereby, the transfer status display unit 60 can notify a user of to what extent a transfer has completed.

With the power charging system 10, power can be supplied from the power supply device 30 to the electronic apparatus 20 by placing the electronic apparatus 20 on the power supply device 30. Furthermore, with the power charging system 10, a program to be executed in the power supply device 30 can be acquired by the electronic apparatus 20 and transferred to the power supply device 30 via the power transmission path 25. Thereby, with the power charging system 10, a new program can be executed by the power supply device 30 even when the power supply device 30 does not have a function to acquire data from the outside.

Figure 3:
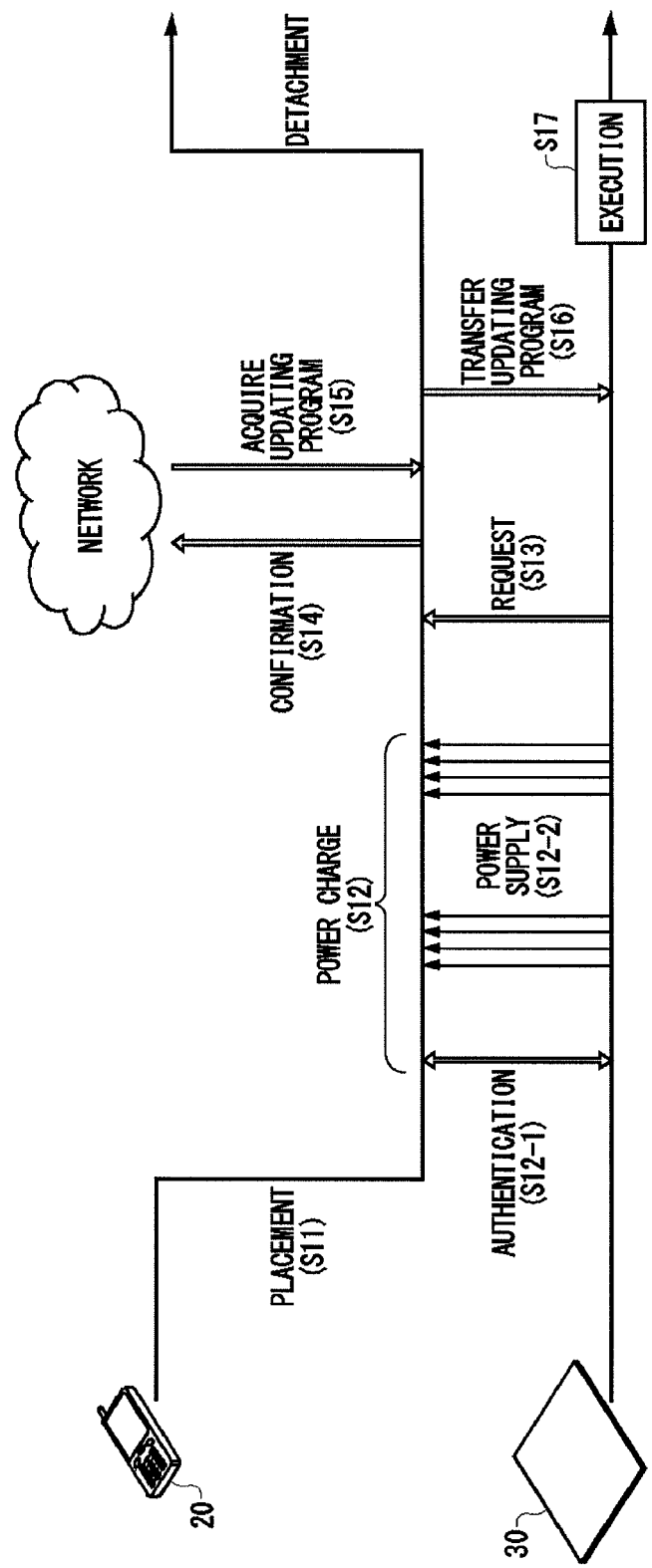
FIG. 3 shows a first flow of power charge and a program updating process in the power charging system 10 according to the present embodiment.

FIG. 3 shows a first flow of power charge and a program updating process in the power charging system 10 according to the present embodiment. First, the electronic apparatus 20 is placed on the power supply device 30 (S11). The power supply device 30 detects whether the electronic apparatus 20 has been located at a position where the electronic apparatus 20 can receive power from the power supply device 30. For example, the power supply device 30 detects whether the electronic apparatus 20 has been placed by using a sensor. Also, for example, the power supply device 30 detects whether the electronic apparatus 20 has been placed based on a load change in the power transmission path 25.

Subsequently, the power supply device 30 supplies power to the electronic apparatus 20 via the power transmission path 25, under a condition that the electronic apparatus 20 has been located at a position where the electronic apparatus 20 can receive power (S12). At a step S12, more specifically, the power supply device 30 first communicates with the electronic apparatus 20 via the power transmission path 25 to authenticate whether the placed electronic apparatus 20 is an apparatus to which power is allowed to be supplied (S12-1). When the placed electronic apparatus 20 is authenticated, the power supply device 30 subsequently supplies power to the electronic apparatus 20 via the power transmission path 25 (S12-2). Thereby, the electronic apparatus 20 can charge the secondary battery 34 with power supplied from the power supply device 30.

Then, the power supply device 30 stops power supply at a time when sufficient power is stored in the secondary battery 34 of the electronic apparatus 20. When power supply is stopped, the power supply device 30 subsequently transmits, to the electronic apparatus 20 via the power transmission path 25, a request to transfer an updating program (S13). More specifically, the power supply device 30 transmits a request to transfer an updating program, under a condition that the electronic apparatus 20 has been located at a position where the electronic apparatus 20 can receive power and the power supply device 30 is not supplying power to the electronic apparatus 20.

Upon acquiring, from the power supply device 30, the request to transfer an updating program from the electronic apparatus 20, the electronic apparatus 20 confirms whether there is an updating program for the power supply device 30 with a designated server via a network (S14). When there is an updating program in the server, the electronic apparatus 20 downloads and acquires the updating program from the server (S15). In this case, when there is an updating program in an external memory, the electronic apparatus 20 may read out and acquire the updating program from the external memory instead of from the server.

Subsequently, the electronic apparatus 20 transmits the acquired updating program to the power supply device 30 via the power transmission path 25 (S16). The power supply device 30 receives the updating program transmitted from the electronic apparatus 20 via the power transmission path 25. Then, upon completing reception of the updating program, the power supply device 30 executes the received updating program (S17). Thereby, the power supply device 30 can update the program to be executed to a new program.

Figure 4:
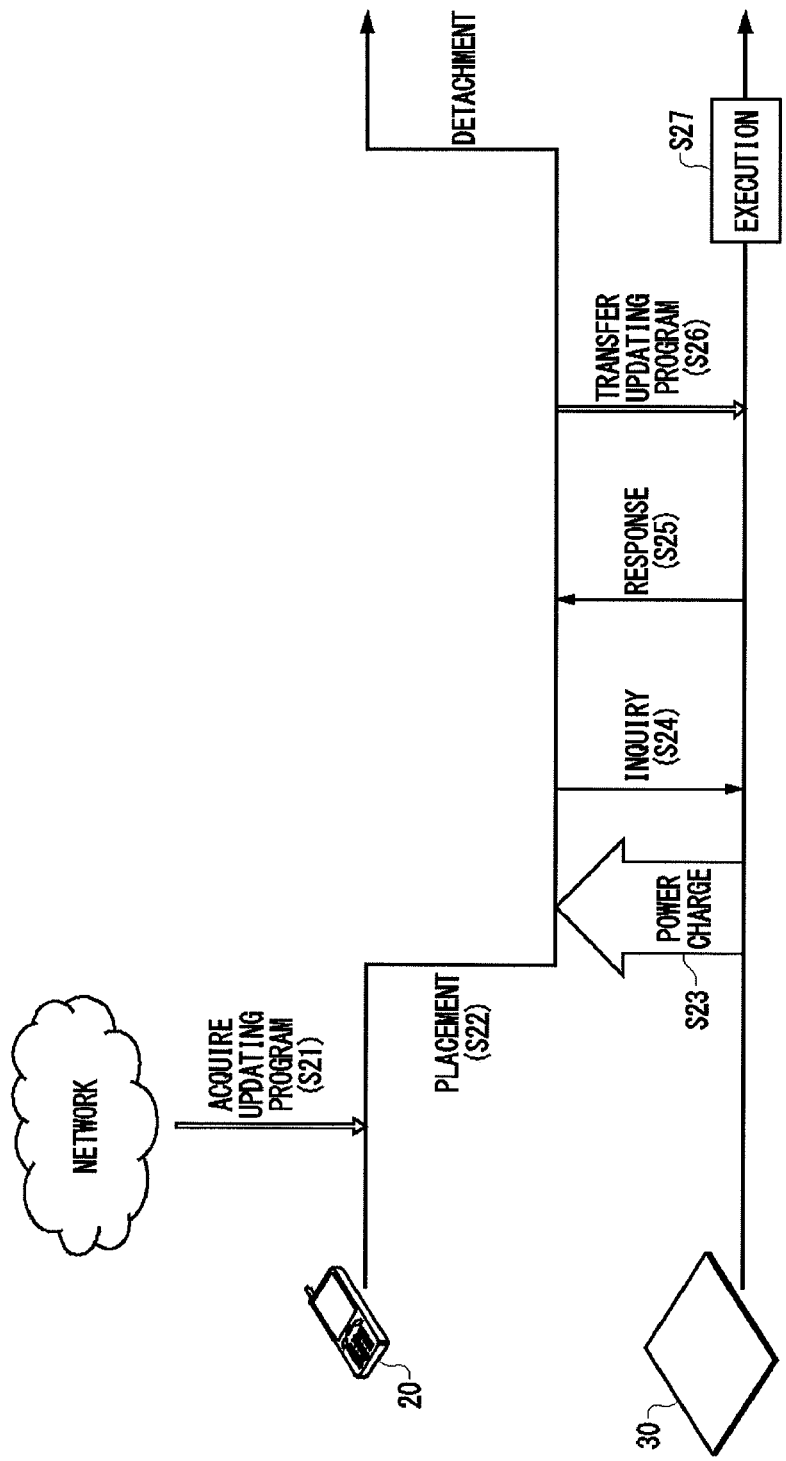
FIG. 4 shows a second flow of power charge and a program updating process in the power charging system 10 according to the present embodiment.

FIG. 4 shows a second flow of power charge and a program updating process in the power charging system 10 according to the present embodiment. The power charging system 10 may execute a program update according to the second flow shown in FIG. 4 instead of the first flow.

First, in a state that the electronic apparatus 20 is not placed on the power supply device 30, the electronic apparatus 20 acquires, from the outside of the electronic apparatus 20 (for example, from a server or an external memory), an updating program for updating a program to be executed by the power supply device 30 (S21). For example, the electronic apparatus 20 periodically accesses a server to confirm whether there is a latest updating program, and, when there is a latest updating program, downloads the program. Then, the electronic apparatus 20 stores the acquired updating program therein.

Subsequently, the electronic apparatus 20 is placed on the power supply device 30 (S22). Subsequently, the power supply device 30 supplies power to the electronic apparatus 20 via the power transmission path 25, under a condition that the electronic apparatus 20 is located at a position where the electronic apparatus 20 can receive power. The power supply processing is executed in a manner similar to the processing of the step S12 shown in FIG. 3. Thereby, the electronic apparatus 20 can charge the secondary battery 34 with power supplied from the power supply device 30 (S23).

Then, the power supply device 30 stops power supply at a time when sufficient power is stored in the secondary battery 34 of the electronic apparatus 20. When power supply is stopped, the electronic apparatus 20 subsequently inquires, via the power transmission path 25, whether to update a program (S24). More specifically, in a state that the electronic apparatus 20 has been located at a position. where the electronic apparatus 20 can receive power from the power supply device 30 and is not receiving power from the power supply device 30, the electronic apparatus 20 inquires, via the power transmission path 25, whether to update the program, under a condition that an updating program is stored therein.

Subsequently, in response to receiving the inquiry from the electronic apparatus 20 concerning whether to update the program, the power supply device 30 answers that the program is to be updated if the update is possible (S25). Subsequently, when the power supply device 30 answers that the program is to be updated, the electronic apparatus 20 transmits the stored updating program to the power supply device 30 via the power transmission path 25 (S26). In this case, when the electronic apparatus 20 stores a plurality of types of updating programs therein, the electronic apparatus 20 acquires, in advance via power transmission path 25, the identification information of the power supply device 30, and transmits, to the power supply device 30 via the power transmission path 25, an updating program for updating a program to be executed by an apparatus corresponding to the identification information.

The power supply device 30 receives the updating program transmitted from the electronic apparatus 20 via the power transmission path 25. Then, upon completing reception of the updating program, the power supply device 30 executes the received updating program (S27). With the processing according to the flow, the power charging system 10 can update the program of the power supply device 30 even in an environment where the electronic apparatus 20 cannot connect to a network in a state the electronic apparatus 20 has been placed on the power supply device 30 because the electronic apparatus 20 acquires the updating program in advance when the electronic apparatus 20 is connected to a network and the like.

Figure 5:
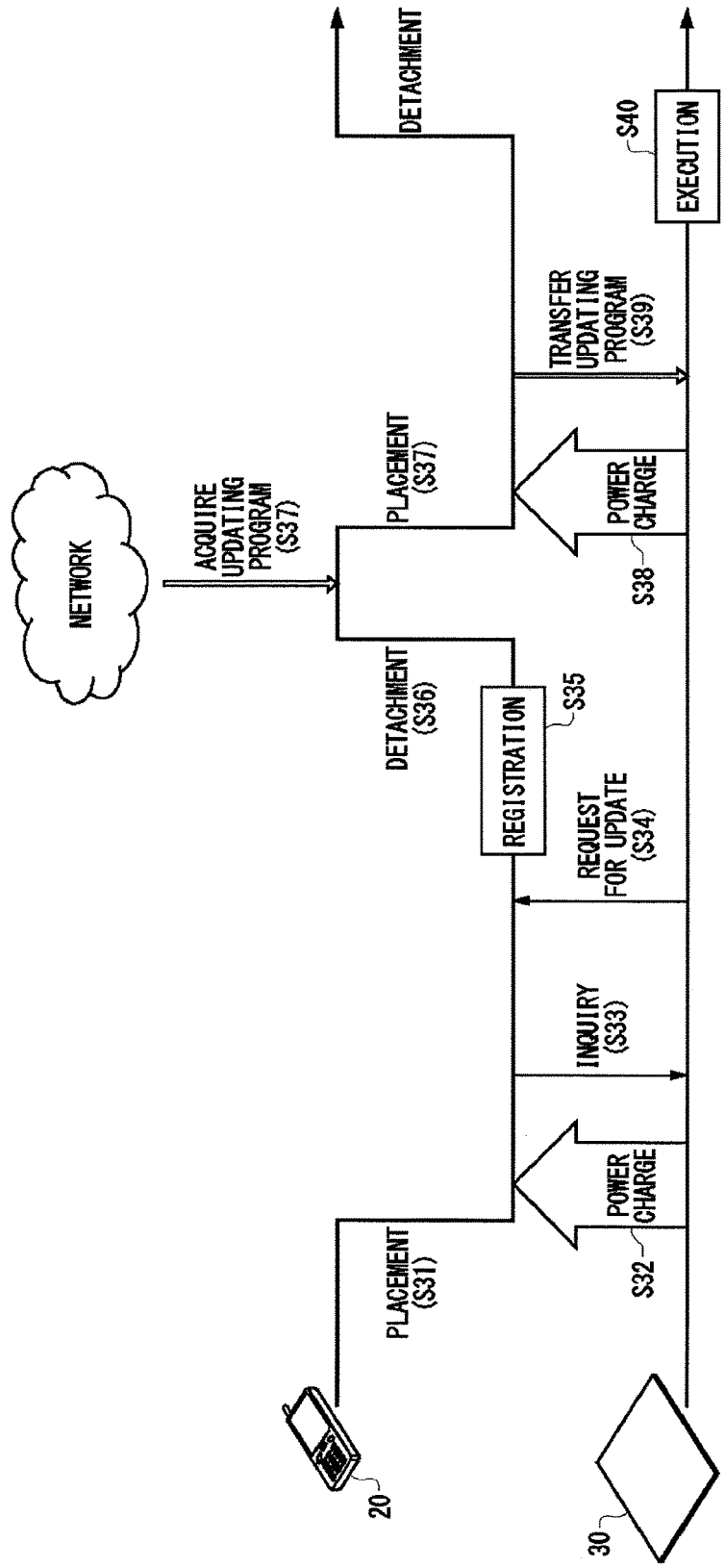
FIG. 5 shows a third flow of power charge and a program updating process in the power charging system 10 according to the present embodiment.

FIG. 5 shows a third flow of power charge and a program updating process in the power charging system 10 according to the present embodiment. The power charging system 10 may execute a program update according to the third flow shown in FIG. 5 instead of the first and second flows.

First, the electronic apparatus 20 is placed on the power supply device 30 (S31). Subsequently, the power supply device 30 supplies power to the electronic apparatus 20 via the power transmission path 25, under a condition that the electronic apparatus 20 has been located at a position where the electronic apparatus 20 can receive power. The power supply processing is executed in a manner similar to the processing of the step S12 shown in FIG. 3. Thereby, the electronic apparatus 20 can charge the secondary battery 34 with power supplied from the power supply device 30 (S32).

Then, the power supply device 30 stops power supply at a time when sufficient power is stored in the secondary battery 34 of the electronic apparatus 20. When power supply is stopped, the electronic apparatus 20 subsequently inquires, via the power transmission path 25, whether to update a program (S33). More specifically, in a state that the electronic apparatus 20 has been located at a position where the electronic apparatus 20 can receive power from. the power supply device 30 and is not receiving power from the power supply device 30, the electronic apparatus 20 inquires, via the power transmission path 25, whether to update the program, under a condition that an updating program is stored therein.

In response to receiving the inquiry from the electronic apparatus 20 whether to update the program, the power supply device 30 transmits, to the electronic apparatus 20 via the power transmission path 25, a request to update the program if the update is possible (S34). In response to receiving the request to update the program from the power supply device 30, the electronic apparatus 20 registers therein the request to update the program from the power supply device 30 (S35).

Subsequently, the electronic apparatus 20 is removed from above the power supply device 30 (S36). In a state that the electronic apparatus 20 is not placed on the power supply device 30, the electronic apparatus 20 acquires the updating program of the power supply device 30 from the outside of the electronic apparatus 20 (for example, from a server or an external memory), under a condition. that the request to update the program is registered therein (S37). Then, the electronic apparatus 20 stores therein the acquired updating program.

Subsequently, the electronic apparatus 20 is placed on the power supply device 30 again (S37). The power supply device 30 supplies power to the electronic apparatus 20 via the power transmission path 25, under a condition that the electronic apparatus 20 has been located at a position where the electronic apparatus 20 can receive power. The electronic apparatus 20 charges the secondary battery 34 inside thereof with power supplied from the power supply device 30 (S38).

Subsequently, the electronic apparatus 20 transmits the stored updating program via the power transmission path 25 to the power supply device 30 that has issued the request to update the program, (S39). For example, the electronic apparatus 20 determines whether the power supply device 30 on which the electronic apparatus 20 is placed is an apparatus that has issued the request to update the program by acquiring the identification information of the power supply device 30.

The power supply device 30 receives the updating program transmitted from the electronic apparatus 20 via the power transmission path 25. Then, upon completing reception of the updating program, the power supply device 30 executes the received updating program (S40). With the processing according to the flow, the power charging system 10 can acquire an updating program efficiently because the updating program is acquired after the electronic apparatus 20 receives a request from the power supply device 30.

Figure 6:
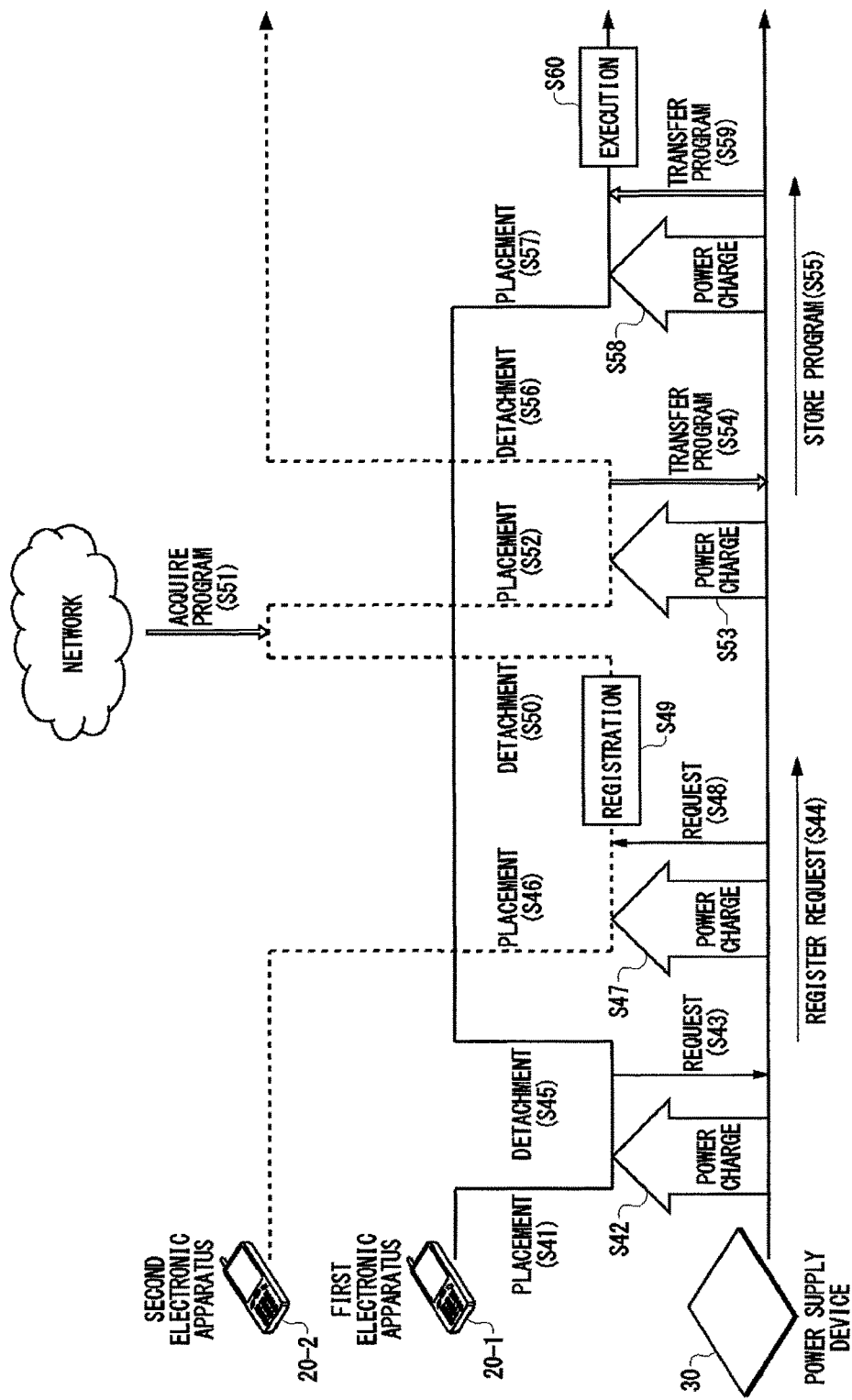
FIG. 6 shows a fourth flow of power charge and a program updating process in the power charging system 10 according to the present embodiment.

FIG. 6 shows a fourth flow of power charge and a program updating process in the power charging system 10 according to the present embodiment. The power charging system 10 may execute a program update according to the fourth flow shown in FIG. 6 instead of the first to third flows.

First, a first electronic apparatus 20-1 is placed on the power supply device 30 (541). Subsequently, the power supply device 30 supplies power to the first electronic apparatus 20-1 via the power transmission path 25, under a condition that the first electronic apparatus 20-1 has been located at a position where the first electronic apparatus 20-1 can receive power. The power supply processing is executed in a manner similar to the processing of the step S12 shown in FIG. 3. Thereby, the first electronic apparatus 20-1 can charge the secondary battery 34 with power supplied from the power supply device 30 (S42).

Then, the power supply device 30 stops power supply at a time when sufficient power is stored in the secondary battery 34 of the first electronic apparatus 20-1. When power supply is stopped, the first electronic apparatus 20-1 subsequently transmits, to the power supply device 30 via the power transmission path 25, a request to acquire a first program to be executed for the first electronic apparatus 20-1 (S43). More specifically, the first electronic apparatus 20-1 transmits a request to acquire the first program, under a condition that the electronic apparatus 20 has been located at a position where the electronic apparatus 20 can receive power from the power supply device 30, and is not receiving power from the power supply device 30.

Upon receiving the request from the first electronic apparatus 20-1, the power supply device 30 registers therein the request received from the first electronic apparatus 20-1 (S44). Then, the first electronic apparatus 20-1 is removed from above the power supply device 30 (S45).

Subsequently, a second electronic apparatus 20-2 is placed on the power supply device 30 (S46). Subsequently, the power supply device 30 supplies power to the second electronic apparatus 20-2 via the power transmission path 25, under a condition that the second electronic apparatus 20-2 has been placed at a position where the second electronic apparatus 20-2 can receive power. Thereby, the second electronic apparatus 20-2 can charge the secondary battery 34 with power supplied from the power supply device 30 (S42).

Then, the power supply device 30 stops power supply at a time when sufficient power is stored in the secondary battery 34 of the second electronic apparatus 20-2. When power supply is stopped, the power supply device 30 subsequently transmits, to the second electronic apparatus 20-2 via the power transmission path 25, a request to acquire the first program (S48). More specifically, the power supply device 30 transmits, to the second electronic apparatus 20-2, the request to acquire the first program, under a condition that the request from the first electronic apparatus 20-1 is registered therein, the second electronic apparatus 20-2 has been located at a position where the second electronic apparatus 20-2 can receive power and power is not supplied to the second power supply device 30-2. In response to receiving, from the power supply device 30, the request to acquire the first program, the second electronic apparatus 20-2 registers therein the request to acquire the first program from the power supply device 30 (S49).

Subsequently, the second electronic apparatus 20-2 is removed from above the power supply device 30 (S50). In a state that the second electronic apparatus 20-2 is not placed on the power supply device 30, the second electronic apparatus 20-2 acquires, from the outside of the second electronic apparatus 20-2 (for example, from a server or an external memory), the first program indicated in the request, under a condition that the request received from the power supply device 30 is registered therein and the program can be acquired from the outside (S51). Then, the second electronic apparatus 20-2 stores therein the acquired first program.

Subsequently, the second electronic apparatus 20-2 is placed on the power supply device 30 again (S52). The power supply device 30 supplies power to the second electronic apparatus 20-2 via the power transmission path 25, under a condition that the second electronic apparatus 20-2 has been placed at a position where the second electronic apparatus 20-2 can receive power. The second electronic apparatus 20-2 charges the secondary battery 34 inside thereof with power supplied from the power supply device 30 (S53).

Subsequently, the second electronic apparatus 20-2 transmits the first program stored therein to the power supply device 30 via the power transmission path 25, under a condition that the second electronic apparatus 20-2 stores the first program therein, and has been located at a position where the second electronic apparatus 20-2 can receive power from the power supply device 30 (S54). Upon receiving the first program from the second electronic apparatus 20-2, the power supply device 30 stores the received first program therein (S55). Then, the second electronic apparatus 20-2 is removed from above the power supply device 30 (S56).

Subsequently, the first electronic apparatus 20-1 is placed on the power supply device 30 again (S57). The power supply device 30 supplies power to the first electronic apparatus 20-1 via the power transmission path 25, under a condition that the first electronic apparatus 20-1 has been located at a position where the first electronic apparatus 20-1 can receive power. The first electronic apparatus 20-1 charges the secondary battery 34 inside thereof with power supplied from the power supply device 30 (S58).

Subsequently, the power supply device 30 transmits, to the first power supply device 30-1 via the power transmission path 25, the first program stored therein (S59). More specifically, the power supply device 30 transmits the first program to the first electronic apparatus 20-1, under a condition that the first program is stored therein and the first electronic apparatus 20-1 is located at a position where the first electronic apparatus 20-1 can receive power. For example, the power supply device 30 determines whether the placed power supply device 30 is an apparatus that has issued the request to acquire the program by acquiring the identification information of the electronic apparatus 20.

The first electronic apparatus 20-1 receives the first program transmitted from the power supply device 30 via the power transmission path 25. Then, upon completing reception of the first program, the first electronic apparatus 20-1 executes the received first program (S60).

With the processing according to the flow, the power charging system 10 can cause an updating program for the first electronic apparatus 20-1 to be acquired by the second electronic apparatus 20-2 to transfer the updating program from the second electronic apparatus 20-2 to the first electronic apparatus 20-1 via the power supply device 30. Thereby, the power charging system 10 can update a program to be executed by the first electronic apparatus 20-1 even when the first electronic apparatus 20-1 does not have a function to connect to a network or an external memory.

Figure 7:
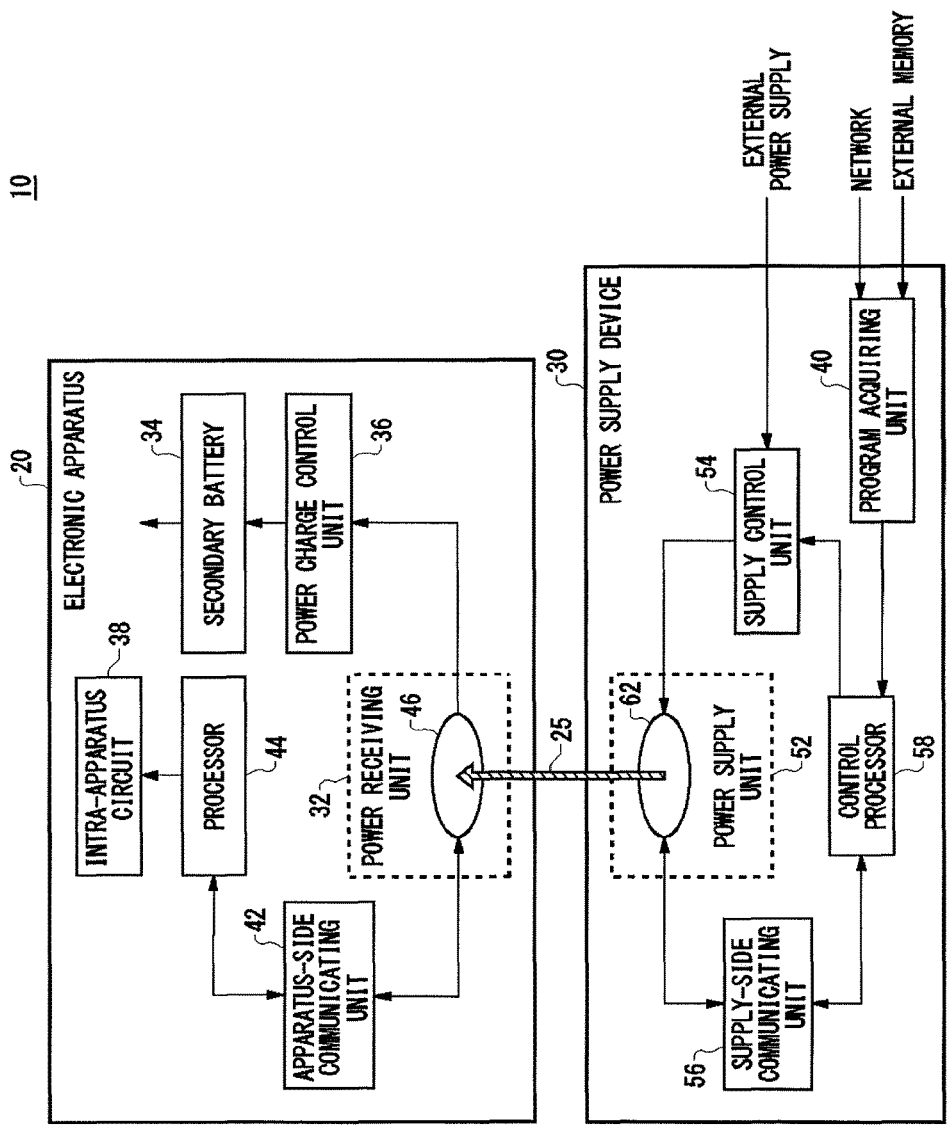
FIG. 7 shows the functions and configuration of the power charging system 10 according to a first variant of the present embodiment.

FIG. 7 shows the functions and configuration of the power charging system 10 according to a first variant of the present embodiment. Because the power charging system 10 according to the first variant adopts the functions and configuration substantially the same with those of the power charging system 10 explained in conjuncture with FIGS. 1 to 6, only differences are explained.

The power supply device 30 according to the present variant further has the program acquiring unit 40. Also, the electronic apparatus 20 according to the present variant may not have the program acquiring unit 40. The power supply device 30 according to the present variant can connect to a server via a network, or acquire data from an external memory.

The program acquiring unit 40 acquires and stores therein an updating program for the electronic apparatus 20 via the network or the external memory. Then, in a state that the electronic apparatus 20 is placed thereon, the power supply device 30 according to the present variant transmits the acquired updating program to the electronic apparatus 20 via the power transmission path 25. Thereby, the power charging system 10 can update the program to be executed by the electronic apparatus 20 even when the electronic apparatus 20 does not have a function to connect to a network or an external memory.

Figure 8:
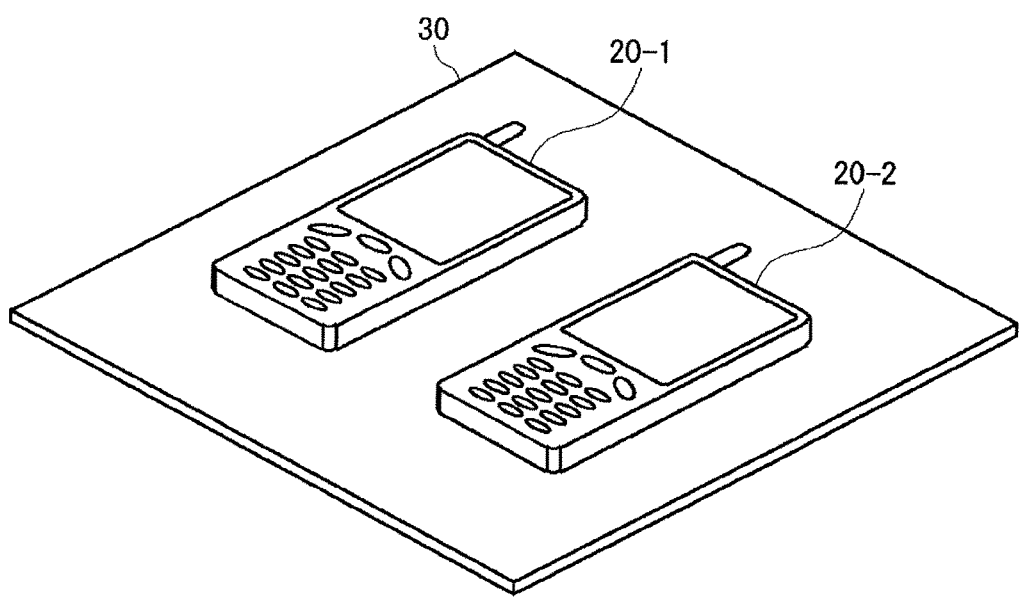
FIG. 8 shows the appearance of the power charging system 10 according to a second variant of the present embodiment.

FIG. 8 shows the appearance of the power charging system 10 according to a second variant of the present embodiment. Because the power charging system 10 according to the second variant adopts the functions and configuration substantially the same with those of the power charging system 10 explained in conjuncture with FIGS. 1 to 6, only differences are explained.

The power charging system 10 according to the present variant can supply power to a plurality of the electronic apparatus 20 concurrently. In the present variant, the power supply device 30 has a plurality of the power supply units 52 therein, and can form a plurality of the power transmission paths 25 simultaneously. Then, when the electronic apparatus 20 are placed thereon, the power supply device 30 detects the positions where the electronic apparatus 20 are placed, and operates the power supply units 52 corresponding to the electronic apparatus 20 at the detected positions to supply power to the corresponding electronic apparatus 20.

Also, in the present variant, one of the plurality of the electronic apparatus 20 to be placed on the power supply device 30 acquires, from the outside, a program to be executed by the power supply device 30. Then, in the present variant, the electronic apparatus 20 that has acquired the program from the outside transmits the program to the power supply device 30 via the power transmission path 25.

Figure 9:
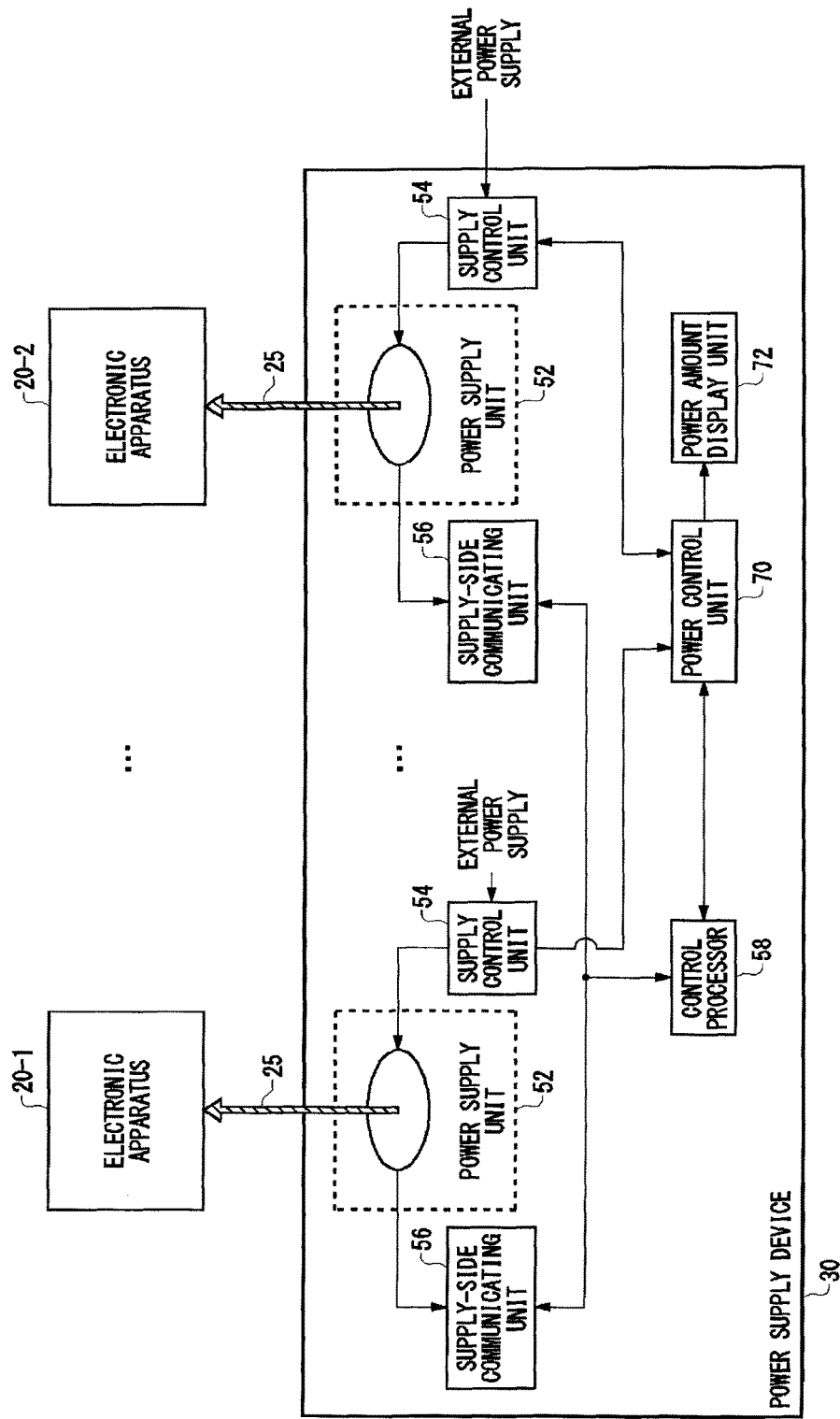
FIG. 9 shows the functions and configuration of a power supply device 30 in the power charging system 10 according to the second variant of the present embodiment.

FIG. 9 shows the functions and configuration of the power supply device 30 in the power charging system 10 according to the second variant of the present embodiment. The power supply device 30 has the plurality of the power supply units 52, a plurality of the supply control units 54, a plurality of the supply-side communicating units 56, the control processor 58, a power control unit 70, and a power amount display unit 72.

Each of the plurality of the supply control units 54 and each of the plurality of the supply-side communicating units 56 are provided corresponding to each of the plurality of the power supply units 52. The control processor 58 exchange data with the plurality of the supply-side communicating units 56 and controls the entire operation of the power supply device 30.

The power control unit 70 controls each of the plurality of the supply control units 54 to control the amount of power supplied to the plurality of the electronic apparatus 20. The power control unit 70 may he realized as a function of the control processor 58. The power amount display unit 72 displays the total amount of power supplied from the power supply device 30 to the electronic apparatus 20.

In the power supply device 30, when one of the electronic apparatus 20 is located at a position where the electronic apparatus 20 can receive power from the power supply device 30, the supply-side communicating unit 56 communicates with the electronic apparatus 20 via the corresponding power transmission path 25 to acquire the maximum power consumption value of the electronic apparatus 20. Then, when the power supply device 30 supplies power to the plurality of the electronic apparatus 20 concurrently, the power control unit 70 limits the supplied power amount based on the maximum power consumption value of each of the plurality of the electronic apparatus 20 so that the total supplied power amount does not become a predetermined value or higher.

For example, the power control unit 70 switches over from one of the electronic apparatus 20 to another, to which power is supplied, at predetermined intervals, or makes the amount of power to be supplied to the plurality of the electronic apparatus 20 smaller than that at the normal time. Thereby, the power control unit 70 can prevent an expectedly large current from flowing when the plurality of the electronic apparatus 20 is placed. Also, the power amount display unit 72 may display the total power amount to allow the user to recognize the amount of power being supplied.

While the embodiment (s) of the present invention has (have) been described, the technical scope of the invention is not limited to the above described embodiment (s). It is apparent to persons skilled in the art that various alterations and improvements can be added to the above-described embodiment (s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The invention claimed is:

1. An electronic apparatus that is configured to perform non-contact charging, the electronic apparatus comprising:
a memory;
a battery;

a non-contact type power receiving unit that receives power via a power transmission path of non-contact charging from a power supply device to the electronic apparatus;

a power charge control unit that causes the power that the power receiving unit has received from the power supply device to be supplied to and stored in the battery;

a program acquiring unit that acquires, from over a network or via an external memory, an updating program to be executed by a second electronic apparatus, separate from the electronic apparatus, and that stores the acquired updating program in the memory of the electronic apparatus, where in the acquired updating program is an updating program that updates a current program to be executed by the second electronic apparatus to a new program to be executed by the second electronic apparatus; and an apparatus-side communicating unit that controls the power receiving unit to modulate a current of power flowing through the power transmission path of non-contact charging such that the updating program is transmitted, via the modulation, from the electronic apparatus to the power supply device via the power transmission path of non-contact charging, wherein the power supply device includes a supply-side communicating unit that transmits the updating program from the power supply device to the second electronic apparatus, under a condition that the second electronic apparatus is located at a position where the second electronic apparatus can receive power from the power supply device.

2. The electronic apparatus according to claim 1, wherein the apparatus-side communicating unit controls the power receiving unit to transmit the updating program to the power supply device via the power transmission path.

3. The electronic apparatus according to claim 2, wherein the apparatus-side communicating unit:
transmits an inquiry, via the power transmission path, to the power supply device; and
upon receipt of a response indicating that the current program is to be updated, transmits the updating program to the power supply device via the power transmission path.

4. The electronic apparatus according to claim 2, wherein the apparatus-side communicating unit:
acquires identification information from the power supply device via the power transmission path; and
transmits, to the power supply device via the power transmission path, a program to be executed by an apparatus corresponding to the identification information as the updating program.

5. The electronic apparatus according to claim 2, wherein the apparatus-side communicating unit:
registers a request for a program update received from the power supply device via the power transmission path;
acquires the updating program from the network or an external memory and stores the updating program, after the request for the program update is registered; and
transmits the updating program via the power transmission path to the power supply device that issued the request for the program update, after the updating program is stored.

6. The electronic apparatus according to claim 1, wherein the apparatus-side communicating unit controls the power receiving unit to transmit the updating program after stopping the supply of the received power to the battery.

7. The electronic apparatus according to claim 1, wherein the power supply device supplies power to the electronic apparatus by at least one of the following types of power supply: electric field, magnetic resonance, and electromagnetic induction.

8. The electronic apparatus according to claim 1, wherein the electronic apparatus can be charged merely by being placed on the power supply device without requiring special attachment and detachment operations with respect to electrical terminal contacts.

9. The electronic apparatus according to claim 1, wherein the acquired updating program is an updating program for updating a scheme to authenticate an ID between the power supply device and the electronic apparatus.

10. The electronic apparatus according to claim 1, wherein the acquired updating program is an updating program for supporting a new type of electronic apparatus.

11. The electronic apparatus according to claim 1, wherein the electronic apparatus downloads and acquires the updating program from a server.

12. A method comprising:
receiving, by a non-contact power receiving interface of an electronic apparatus, power via a power transmission path of non-contact charging from a power supply device to the electronic apparatus;
causing, by the electronic apparatus, power that the power receiving interface has received from the power supply device to be supplied to and stored in a battery of the electronic apparatus;
acquiring, by the electronic apparatus, from over a network or via an external memory, an updating program to be executed by a second electronic apparatus, separate from the electronic apparatus, wherein the acquired updating program is an updating program that updates a current program to be executed by the second electronic apparatus to a new program to be executed by the second electronic apparatus;
storing, by the electronic apparatus in a memory of the electronic apparatus, the acquired updating program;
controlling, by the electronic apparatus, the power receiving interface to modulate a current of power flowing through the power transmission path of non-contact charging such that the stored updating program is transmitted, via the modulation, from the electronic apparatus to the power supply device via the power transmission path of non-contact charging; and
transmitting, by a supply-side communicating unit of the power supply device, the updating program to the second electronic apparatus, under a condition that the second electronic apparatus is located at a position where the second electronic apparatus can receive power from the power supply device.

13. A power supply device that is configured to perform non-contact power supply, the power supply device comprising:
a memory;
a power supply unit that supplies power to a first electronic apparatus via a power transmission path of non-contact charging from the power supply device to the first electronic apparatus;
a supply-side communicating unit that controls the power supply unit to demodulate a current of power flowing through the power transmission path of non-contact charging such that an updating program to be executed by a second electronic apparatus, separate from the first electronic apparatus, is acquired from the first electronic apparatus by the demodulated current of power flowing through the power transmission path of non-contact charging, wherein the acquired updating program is an updating program that updates a current program to be executed by the second electronic apparatus to a new program to be executed by the second electronic apparatus; and a supply-side communicating unit that transmits the updating program from the power supply device to the second electronic apparatus, under a condition that the second electronic apparatus is located at a position where the second electronic apparatus can receive power from the power supply device.

14. The power supply device according to claim 13, further comprising a display that displays a transfer status of the transmission of the updating program from the electronic apparatus to the power supply device via the power transmission path of non-contact charging.

15. The power supply device according to claim 13, wherein the power supply device is able to supply power to a plurality of electronic apparatuses concurrently, when one of the first and second electronic apparatuses is located at a position where the one of the first and second electronic apparatuses is able to receive power from the power supply device, the supply-side communicating unit controls the power supply unit to communicate with the one of the first and second electronic apparatuses via the power transmission path to acquire a maximum power consumption value of the one of the first and second electronic apparatuses, and the power supply device further comprises a power control unit that limits a total supplied power amount to be less than a predetermined value based on a respective maximum power consumption value of each of the plurality of electronic apparatuses when the power supply device supplies power to the plurality of electronic apparatuses concurrently.

16. The power supply device according to claim 13, further comprising a display that displays a total supplied power amount.

17. The power supply device according to claim 13, wherein the power supply device supplies power to the first electronic apparatus by at least one of the following types of power supply: electric field, magnetic resonance, and electromagnetic induction.

18. The power supply device according to claim 13, wherein the power supply device is tabular, and supplies power to the first electronic apparatus in a state that the first electronic apparatus is placed on a surface of the power supply device.

19. The power supply device according to claim 13, wherein the first electronic apparatus can be charged merely by being placed on the power supply device without requiring special attachment and detachment operations with respect to electrical terminal contacts.

20. A method comprising:

supplying power, by a non-contact power supply interface of a power supply device, to a first electronic apparatus via a power transmission path of non-contact charging from the power supply device to the first electronic apparatus;

controlling, by the power supply device, the non-contact power supply interface to demodulate a current of power flowing through the power transmission path of non-contact charging such that an updating program to be executed by a second electronic apparatus, separate from the first electronic apparatus, is acquired from the first electronic apparatus by the demodulated current of power flowing through the power transmission path of non-contact charging, wherein the acquired updating program is an updating program that updates a current program to be executed by the second electronic apparatus to a new program to be executed by the second electronic apparatus; and transmitting, by a supply-side communicating unit of the power supply device, the updating program to the second electronic apparatus, under a condition that the second electronic apparatus is located at a position where the second electronic apparatus can receive power from the power supply device.

21. An electronic apparatus that is configured to perform non-contact charging, the electronic apparatus comprising:

a memory;

a battery; and a non-contact type power receiving unit that:

(1) exchanges power with a power supply device in a non-contact manner via a power transmission path between the power receiving unit and the power supply device, and (2) performs at least one of:

(A) modulates a current of power flowing through the power transmission path of non-contact charging such that an updating program is transmitted, via the modulation, from the electronic apparatus to the power supply device via the power transmission path of non-contact charging, wherein the transmitted updating program is an updating program that updates a current program to be executed by a second electronic apparatus that is separate from the electronic apparatus to a new program to be executed by the second electronic apparatus, and the power supply device includes a supply-side communicating unit that further transmits the updating program from the power supply device to the second electronic apparatus, under a condition that the second electronic apparatus is located at a position where the second electronic apparatus can receive power from the power supply device; and (B) demodulates a current of power flowing through the power transmission path of non-contact charging such that an updating program to be executed by the electronic apparatus is acquired by the demodulated current of power flowing through the power transmission path of non-contact charging and a processor of the electronic apparatus executes the acquired updating program received by the power receiving unit to control the electronic apparatus, wherein the acquired updating program is an updating program that updates a current program to be executed by the electronic apparatus to a new program to be executed by the electronic apparatus, and the power supply device includes a supply-side communicating unit that transmits the acquired updating program to be executed by the electronic apparatus from the power supply device to the electronic device, under a condition that the electronic apparatus is located at a position where the electronic apparatus can receive power from the power supply device.

22. An electronic apparatus that is configured to perform non-contact charging, the electronic apparatus comprising:

a memory;

a battery;
a non-contact type power receiving unit that receives power via a power transmission path of non-contact charging from a power supply device to the electronic apparatus;
a power charge control unit that causes the power that the power receiving unit has received from the power supply device to be supplied to and stored in the battery;
an apparatus-side communicating unit that controls the power receiving unit to demodulate a current of power flowing through the power transmission path of non-contact charging such that an updating program to be executed by the electronic apparatus is acquired from the power supply device by the demodulated current of power flowing through the power transmission path of non-contact charging; and
a processor that executes the updating program received by the power receiving unit to control the electronic apparatus, wherein
the received updating program is an updating program that updates a current program to be executed by the electronic apparatus to a new program to be executed by the electronic apparatus, and
the electronic apparatus acquires the updating program to be executed by the electronic apparatus, under a condition that the electronic apparatus is located at a position where the electronic apparatus can receive power from the power supply device.

23. A power supply device that is configured to perform non-contact power supply, the power supply device comprising:
a memory;
a power supply unit that supplies power to an electronic apparatus via a power transmission path of non-contact charging from the power supply device to the electronic apparatus; and
a supply-side communicating unit that controls the power supply unit to modulate a current of power flowing through the power transmission path of non-contact charging such that an updating program is transmitted by the modulated current of power flowing through the power transmission path of non-contact charging such that the electronic apparatus executes the transmitted updating program, wherein the transmitted updating program is an updating program that updates a current program to be executed by the electronic apparatus to a new program to be executed by the electronic apparatus, and
the electronic apparatus acquires the updating program from the power supply device to be executed by the electronic apparatus, under a condition that the electronic apparatus is located at a position where the electronic apparatus can receive power from the power supply device.

* * * * *